US009538606B2

(12) United States Patent
Fischer et al.

(10) Patent No.: US 9,538,606 B2
(45) Date of Patent: Jan. 3, 2017

(54) ELECTRONIC BALLAST FOR OPERATING AT LEAST A FIRST AND A SECOND CASCADE OF LEDS

(71) Applicant: OSRAM GmbH, Munich (DE)

(72) Inventors: Klaus Fischer, Friedberg (DE); Helmut Endres, Zusmarshausen (DE); Josef Kreittmayr, Bobingen (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 14/911,794

(22) PCT Filed: Jul. 10, 2014

(86) PCT No.: PCT/EP2014/064827
§ 371 (c)(1),
(2) Date: Feb. 12, 2016

(87) PCT Pub. No.: WO2015/022121
PCT Pub. Date: Feb. 19, 2015

(65) Prior Publication Data

US 2016/0183345 A1 Jun. 23, 2016

(30) Foreign Application Priority Data

Aug. 14, 2013 (DE) ........................ 10 2013 216 153

(51) Int. Cl.
*H05B 37/00* (2006.01)
*H05B 33/08* (2006.01)

(52) U.S. Cl.
CPC ...... *H05B 33/0887* (2013.01); *H05B 33/0812* (2013.01); *H05B 33/0824* (2013.01); *Y02B 20/343* (2013.01)

(58) Field of Classification Search
CPC ........................ H05B 33/0812; H05B 33/0824
(Continued)

(56) References Cited

U.S. PATENT DOCUMENTS 6,057,651 A 5/2000 Usami
9,326,334 B2 * 4/2016 Fischer ................ H05B 33/083
(Continued)

FOREIGN PATENT DOCUMENTS

CN 1707381 A 12/2005
CN 102548140 A 7/2012
(Continued)

OTHER PUBLICATIONS

International Search Report based on application No. PCT/EP2014/064827 (3 pages) dated Oct. 23, 2014 (for reference purpose only).
(Continued)

*Primary Examiner* — Jason M Crawford
(74) *Attorney, Agent, or Firm* — Viering, Jentschura & Partner mbB

(57) ABSTRACT

Various embodiments may relate to an electronic ballast for operating at least a first and a second cascade of LEDs, wherein the first cascade of LEDs is designed in such a way that the first cascade of LEDs is not be bridged. In order to provide a target value for a series regulator arranged in series with the LED cascades, a resistance voltage divider is used, which is coupled between the coupling point of the LED cascade that is not bridged and of the LED cascade that is not bridged at one end and the second output connection of the rectifier at the other end.

13 Claims, 3 Drawing Sheets

Figure 1:
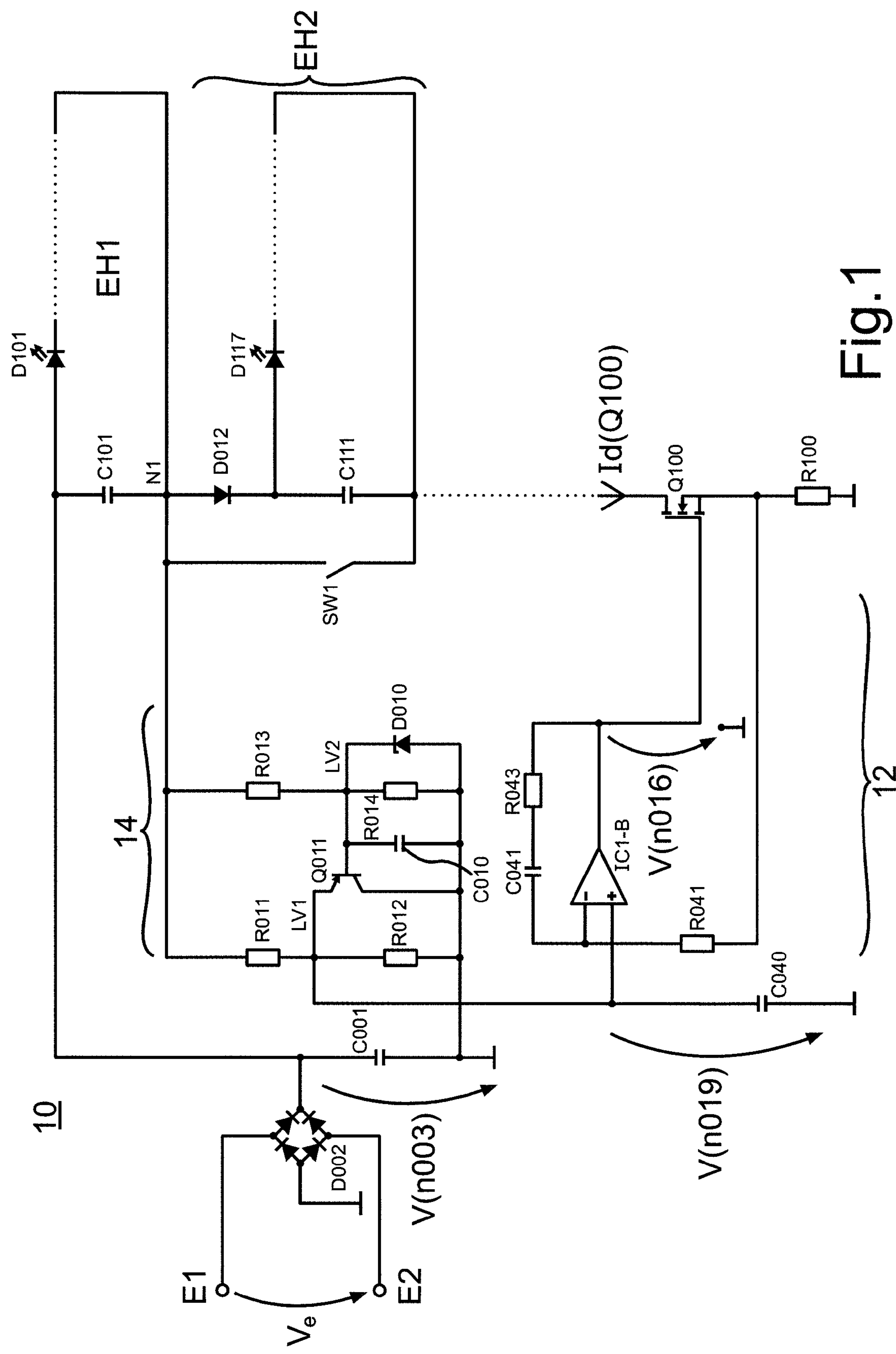

(58) Field of Classification Search
USPC ........ 315/178–179, 185 R, 200 R, 201, 291, 315/294, 297, 307
See application file for complete search history.

(56) References Cited

U.S. PATENT DOCUMENTS

2005/0269968 A1 12/2005 Ito et al.
2006/0175985 A1 8/2006 Huynh et al.
2008/0224636 A1* 9/2008 Melanson .......... H05B 33/0815 315/307
2010/0134018 A1 6/2010 Tziony et al.
2010/0194298 A1 8/2010 Kuwabara
2011/0109245 A1* 5/2011 Lin .................... H05B 33/0815 315/294
2012/0161649 A1 6/2012 Hamamoto et al.
2012/0176826 A1* 7/2012 Lazar .................... H02M 3/158 363/126
2014/0191676 A1* 7/2014 Seider ................ H05B 33/0821 315/193
2014/0320031 A1* 10/2014 Wu .................... H05B 33/0812 315/193
2015/0108909 A1* 4/2015 Rupp .................. H05B 33/083 315/188

FOREIGN PATENT DOCUMENTS

DE 102011088426 A1 6/2013
WO 2011906680 A2 8/2011

OTHER PUBLICATIONS

German Search Report based on application No. 10 2013 216 153.0 (5 pages) dated Mar. 28, 2014 (for reference purpose only).
Chinese Office Action based on application No. 201480044820.9 (5 pages and 7 pages of English translation) dated Aug. 31, 2016.

* cited by examiner (SdT)
a)
b)
c)
V(n003)
Id(Q100)
V(n016)
V(n019)
330V
300V
270V
240V
210V
180V
150V
120V
90V
60V
30V
0V
220mA
200mA
180mA
160mA
140mA
120mA
100mA
80mA
60mA
40mA
20mA
0mA
-20mA
5.5V
5.0V
4.5V
4.0V
3.5V
3.0V
2.5V
2.0V
1.5V
1.0V
0.5V
0.0V
0ms
2ms
4ms
6ms
8ms
10ms
12ms
14ms
16ms
18ms
20ms a)
V(n003)
330V
300V
270V
240V
210V
180V
150V
120V
90V
60V
30V
0V
b)
Id(Q100)
220mA
200mA
180mA
160mA
140mA
120mA
100mA
80mA
60mA
40mA
20mA
0mA
-20mA
c)
V(n016)
V(n019)
5.5V
5.0V
4.5V
4.0V
3.5V
3.0V
2.5V
2.0V
1.5V
1.0V
0.5V
0.0V
0ms
2ms
4ms
6ms
8ms
10ms
12ms
14ms
16ms
18ms
20ms

ELECTRONIC BALLAST FOR OPERATING AT LEAST A FIRST AND A SECOND CASCADE OF LEDS

RELATED APPLICATIONS

The present application is a national stage entry according to 35 U.S.C. §371 of PCT application No.: PCT/EP2014/064827 filed on Jul. 10, 2014, which claims priority from German application No.: 10 2013 216 153.0 filed on Aug. 14, 2013, and is incorporated herein by reference in its entirety.

TECHNICAL FIELD

Various embodiments may relate to an electronic ballast for operating at least a first and a second cascade of LEDs, including an input with a first and a second input terminal for connecting to an alternating power supply voltage, a rectifier that is connected to the first and to the second input terminal, wherein the rectifier has an output with a first and a second output terminal, a first unit that includes the first cascade of LEDs, at least one second unit that includes the second cascade of LEDs, wherein an electronic switch is connected in parallel with the second cascade of LEDs, wherein the first unit is connected to the first output terminal of the rectifier and the at least one second unit is connected in series with the first unit, said connection being at the end of the first unit that is not connected to the first output terminal of the rectifier, a series circuit including a linear controller and a shunt resistor, wherein this series circuit is connected in series between the second unit and the second output terminal of the rectifier, as well as a setpoint value specification device for the linear controller, with a first and a second input and an output, wherein the output of the setpoint value specification device is connected to the linear controller, wherein the first input of the setpoint value specification device is connected to the shunt resistor, wherein the second input of the setpoint value specification device is connected to the tap of the first voltage divider. What is referred to as a "cascade" of LEDs does preferably include a plurality of LEDs, but can, however, also be represented by a single LED.

BACKGROUND

In LED driver schemes in which the LED current, and thereby the grid current, are subject to linear control, and in which, due to their power consumption, it is necessary to ensure that the current drawn from the grid is largely sinusoidal, a setpoint value for the current controller has until now been derived by means of a voltage divider connected to the input voltage with a first and a second ohmic resistor. Since this input voltage is sinusoidal, both the setpoint value and, with an appropriate control concept, also the actual value of the grid current, are therefore also sinusoidal.

There are LED arrangements in which a grid current can only flow when the grid voltage is greater than the forward bias voltage of at least a portion of the LEDs used. These are LED arrangements in which, while particular LEDs of the overall arrangement can indeed be bridged by switches, a specific number of LEDs, in the present case what is known as the first cascade of LEDs are however not bridged, so saving a switch. Such arrangements are subject to the problem that the voltage tap at the voltage divider referred to above also outputs a non-negligible setpoint value during a period of time surrounding the zero transition of the grid, but a grid current corresponding to this setpoint value cannot flow. Through the use of a non-bridgeable cascade of LEDs it is possible to save one switch in the practical implementation. This cascade of LEDs is, accordingly, always in operation, provided the voltage provided at the output of the rectifier is larger than the forward bias voltage of the LEDs of this first cascade. This furthermore entails the advantage that, as long as the required forward bias voltage has not yet been reached, no current, which would merely generate heat loss there, can flow through the linear controller.

When conventional control apparatus is used for the current control this has the result that, starting at the moment at which the instantaneous value of the grid voltage drops below the forward bias voltage of the non-bridgeable portion of the LEDs, the current controller goes into saturation. When, subsequently, with increasing grid voltage it again rises above the forward bias voltage of the non-bridgeable portion of the LEDs, the current controller needs a settling time, during which the grid current is greater than the desired value corresponding to the setpoint value (control deviation). This overshoot in the grid current has a negative effect on the behavior of the overall arrangement in respect of grid current harmonics and of radio interference.

It would be conceivable, in order to solve this problem, to change the time-characteristic of the current controller in such a way that the gaps in the current are "masked out". This, however, would entail the disadvantage that the overall speed of the current control could become too small.

SUMMARY

The present disclosure is therefore based on the object of further developing a generic electronic ballast of the type mentioned above in such a way that while providing an adequate speed of current control, overshoot of the grid current can be suppressed as far as possible.

The present disclosure is based on the idea of not connecting the first voltage divider that is used to form the setpoint value for the LED current directly between the first and second output terminals of the rectifier, but to a potential that is reduced in comparison with the voltage at the output of the rectifier by precisely the forward bias voltage of the non-bridgeable portion of the LEDs, which is to say the first cascade of LEDs. The particular effect of this is that a setpoint value greater than zero is only developed when the input voltage is greater than the forward bias voltage of the non-bridgeable portion of the LEDs.

According to various embodiments therefore the first voltage divider is connected between the coupling point of the first unit and the second unit at one end and the second output terminal of the rectifier at the other end. Through this measure it is achieved that, regardless of the tolerance-dependent and temperature-dependent forward bias voltage of the first cascade of LEDs, a setpoint value greater than zero is supplied to the current controller precisely when the voltage at the output of the rectifier exceeds the instantaneous forward bias voltage of the first cascade of LEDs. This ensures that the current controller cannot go into saturation, whereby an overshoot in the current drawn from the grid is prevented.

In various embodiments, the first voltage divider includes a first and a second ohmic resistor, wherein a capacitor is connected in parallel with the second ohmic resistor of the first voltage divider, which is connected between the tap of the first voltage divider and the second output terminal of the rectifier. This has the effect of eliminating high-frequency spikes at the tap of the first voltage divider.

According to various embodiments, the setpoint value specification device includes an operational amplifier whose inverting input represents the first input of the setpoint value specification device, and whose non-inverting input represents the second input of the setpoint value specification device. Control of the current through the cascades of LEDs can be performed particularly easily in this way. In this context, the operational amplifier is preferably connected in such a way that it acts as a P-controller, a PI-controller or as an I-controller.

According to various embodiments, a capacitor is connected in parallel with the respective cascade of LEDs. Ripple in the light is reduced by this measure, since during the pauses in the grid voltage, i.e. in those phases in which the respective cascade of LEDs is not supplied with current as a result of its forward bias voltage, power is supplied from the respectively assigned buffer capacitor.

In this connection in an advantageous manner a diode is connected in series between the LED cascade of a higher-lying unit and the buffer capacitor of a lower-lying unit. This prevents the buffer capacitor associated with a respective LED cascade from being discharged through the electronic switch that is connected in parallel. "Higher-lying" and "lower-lying" refer to the respective voltage levels at which the respective cascades of LEDs lie.

According to various embodiments, a component that is essentially constant in time in relation to the period duration of the supply grid can be added to the setpoint value formed by the first voltage divider, for example to better utilize the LEDs. This essentially constant offset would in turn form a setpoint value even in the periods of time in which no grid current can flow, which would lead to the saturation state of the current controller described above. An essentially constant offset of this sort could be generated through the addition of an essentially constant voltage to the non-inverting input of the operational amplifier.

Regardless of this, EMC disturbances and grid current harmonics can furthermore occur in those phases in which the voltage provided at the rectifier output is just larger than the forward bias voltage of the first cascade of LEDs, i.e. in the transition phases.

In order to counter these two problems, an auxiliary device may be connected in parallel with the second ohmic resistor of the first voltage divider and is designed to adjust the edge steepness of the voltage dropped across the second ohmic resistor. This auxiliary device thus promotes a further improvement in the operational behavior and optimization of the shape of the grid current curve, in that the component of the setpoint value corresponding to a constant offset, and/or the edge steepness during the fall prior to or during the rise following grid voltage zero transitions is reduced or set to zero depending on the voltage provided by the first voltage divider. In this way the steepness of the rise of the setpoint value, i.e. the rising edge of the supply voltage, or the fall in the setpoint value, i.e. the falling edge of the supply voltage, as well as the position of the edges in relation to the phase position of the input voltage, can be adjusted.

A significant reduction in the radio interference and in the grid current harmonics can thus be achieved through the auxiliary device.

This auxiliary device may include an electronic switch with a control electrode, a working electrode and a reference electrode, wherein the control electrode is connected to the tap of a second voltage divider including a first and a second ohmic resistor, which is connected in parallel with the first voltage divider. This electronic switch accordingly bridges the second ohmic resistor of the first voltage divider when the input voltage, i.e. the voltage at the output of the rectifier, undershoots a certain level. The electronic switch of the auxiliary device then becomes conductive, so that below a certain voltage, the setpoint value becomes prematurely zero. In this way transitions at which the current can flow are smoothed to prevent EMC interference. In order to establish when an LED current can flow, and when not, the auxiliary device is attached to the same tap as the voltage divider that supplies the setpoint value for the linear controller.

The second voltage divider is here preferably dimensioned such that the electronic switch reduces the setpoint value to zero when the input voltage is smaller than the forward bias voltage of the first cascade of LEDs, and that therefore no grid current can flow.

Preferably a Zener diode and/or a capacitor is connected in parallel with the second ohmic resistor of the second voltage divider, which is connected between the tap of the second voltage divider and a reference potential. Through a suitable selection of the capacitance of this capacitor mentioned immediately above, the edge steepness of the voltage across the second ohmic resistor of the first voltage divider, which corresponds to the setpoint value for the linear controller, may be adjusted in this case during the onset of the grid current. The purpose of the Zener diode is simply to limit the voltage between the reference electrode and the control electrode of the electronic switch of the auxiliary device.

Even though the present disclosure is described below for the sake of easier understandability taking the example of an electronic ballast with a first and one second unit, a large number of second units can be provided in practice.

BRIEF DESCRIPTION OF THE DRAWING(S)

Figure 2:
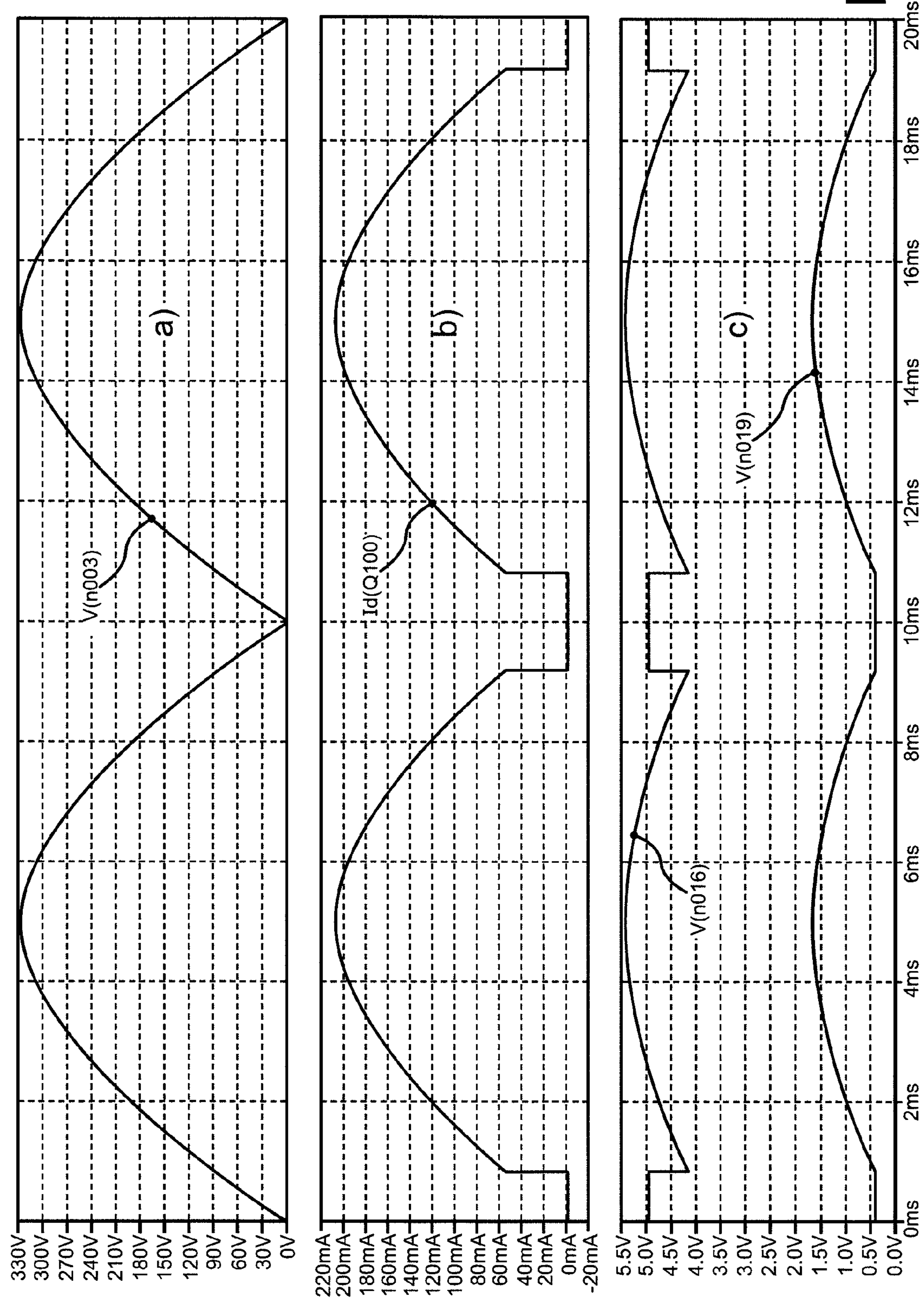
Figure 3:
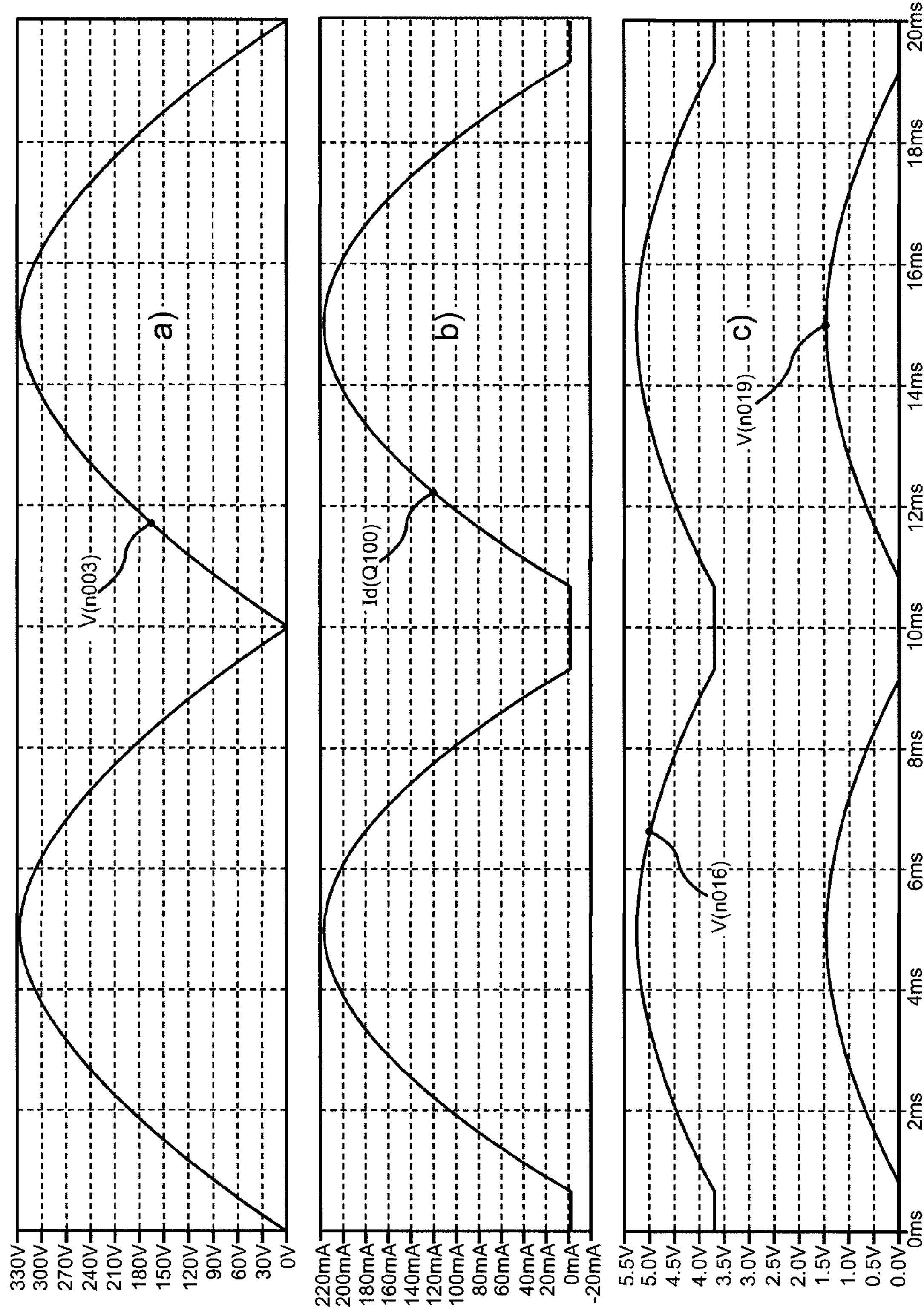

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 1 shows a schematic representation of an exemplary embodiment of an electronic ballast according to the present disclosure;

FIG. 2 and FIG. 3: show the temporal progression of various magnitudes in an electronic ballast according to the prior art (FIG. 2) and in an electronic ballast according to the present disclosure as illustrated in FIG. 1 (FIG. 3).

DETAILED DESCRIPTION

FIG. 1 shows a schematic illustration of an embodiment of an electronic ballast 10 according to the present disclosure. An alternating power supply voltage $V_e$ of, for example, 230 V and 50 Hz, is applied between a first E1 and a second E2 input terminal. This is connected to the input of a rectifier D002, between whose output terminals a capacitor C001 is connected, with the purpose of eliminating HF interference. The voltage dropped across the output terminals of the rectifier D002 is labeled V(n003).

A first, non-bridgeable cascade of LEDs is provided, of which one LED is drawn by way of example, marked as D101. This first cascade of LEDs forms, together with an optional first buffer capacitor C101 that is connected in parallel with this first cascade of LEDs, a first unit EH1. An optional buffer capacitor C111 is connected in parallel with a second cascade of LEDs, of which the LED D117 is drawn by way of example. In order to stop the buffer capacitor C111 from being discharged when the switch SW1 is closed in the direction of the first unit EH1, a diode D012 is connected between the two LED cascades. An electronic switch SW1 is connected in parallel with the series circuit comprised of diode D012 and of the parallel circuit comprised of the LED cascade D117 and the buffer capacitor C111. The second LED cascade D117, the diode D012, the buffer capacitor C111 and the switch SW1 constitute a second unit EH2. A large number of further second units of this type can be connected in series with the first illustrated second unit EH2. Each of these cascades of LEDs is here bridged by the associated switch when the voltage V(n003) is not sufficient to operate the respective cascade of LEDs in addition to the first cascade of LEDs, those of the unit EH1.

The series connection of a linear controller Q100 and a shunt resistor R100 is arranged in series with the units EH1, EH2. The current flowing in the drain terminal of the linear controller Q100 is identified as $I_d$(Q100), and gives rise to a voltage drop in the shunt resistor R100. This current through the linear controller Q100 corresponds to the current drawn from the supply grid and—if no buffer capacitors are used connected in parallel with the LED cascades—to the LED current.

A setpoint value specification device 12 provides a setpoint value to the control electrode of the linear controller Q100. The voltage dropped across the shunt resistor R100 is fed through an ohmic resistor R041 to the inverting input of an operational amplifier IC1-B for this purpose. The non-inverting input of this operational amplifier IC1-B is connected to the tap of a voltage divider that includes the ohmic resistors R011 and R012. According to the present disclosure, this voltage divider is not connected directly between the output terminals of the rectifier D002, but between the coupling point N1 of the first unit EH1 to the second unit EH2 at one end, and to the second output terminal of the rectifier D002 at the other end.

In order to avoid high-frequency spikes, a capacitor C040 is connected in parallel with the resistor R012. The voltage at the non-inverting input of the operational amplifier IC1-B is identified as V(n019). The voltage at the output of the operational amplifier IC1-B is identified as V(n016). The series connection of a capacitor C041 and of an ohmic resistor R043 is connected in the feedback network of the operational amplifier IC1-B. A PI controller is implemented in this way.

Since the voltage divider including the ohmic resistors R011 and R012 is not connected directly to the higher-voltage terminal of the rectifier D002, but to a potential that is lower than the voltage at the rectifier output by precisely the forward-bias voltage of the first cascade of LEDs, it follows that a setpoint value greater than zero is only formed when the output voltage V(n003) of the rectifier D002 is greater than the forward-bias voltage of the first cascade of LEDs.

An auxiliary device identified as 14 serves to reduce the measures required for radio interference suppression and the reduction of grid current harmonics. It permits the edge steepness before and after those phases in which the voltage provided at the rectifier output is somewhat larger than the forward bias voltage of the first cascade of LEDs, i.e. at the transition phases, to be adjusted.

This auxiliary device 14 includes a further voltage divider with the ohmic resistors R013 and R014, which is connected in parallel with the first voltage divider, i.e. in particular also with the coupling point N1. The control electrode of a transistor Q011 is connected to the tap of the voltage divider R013, R014. The resistors R013 and R014 are dimensioned here such that the transistor Q011 reduces the setpoint value to zero when the input voltage is just a little larger than the forward bias voltage of the first LED cascade, and thus no grid current $I_d$(Q100) can flow.

On the one side a capacitor C010 and on the other side the Zener diode D010 are connected in parallel with the resistor R014.

Through a suitable selection of the capacitance of the capacitor C010 it is thus possible to adjust the edge steepness of the voltage across R012, which corresponds to the setpoint value for the linear controller Q100, during the onset of the current $I_d$(Q100). The Zener diode D010 only serves to limit the base-emitter voltage at Q011.

Through suitable dimensioning of the auxiliary device 14 it is possible to adjust the steepness in the rise of the setpoint value, i.e. at a rising edge of the voltage V(n003), and of the fall in the setpoint value, i.e. at a falling edge of the voltage V(n003), as well as the position of the edges in relation to the phase position of the voltage V(n003) at the output of the rectifier.

FIGS. 2 and 3 show the temporal progression of various magnitudes in an electronic ballast according to the prior art (FIG. 2) and an electronic ballast according to the present disclosure as illustrated in FIG. 1 (FIG. 3).

The respective diagram a) shows the voltage V(n003) between the output terminals of the rectifier D002. The temporal progression of the current $I_d$(Q100) is shown on the respective diagram b). Diagram c) shows on the one hand the temporal progression of the voltage V(n019) at the non-inverting input of the operational amplifier IC1-B, i.e. the voltage at the tap of the first voltage divider R011, R012, as well as the temporal progression of the voltage V(n016) at the output of the operational amplifier IC1-B, i.e. of the signals at the control electrode of the linear controller Q100.

The voltage V(n003) is identical in the diagrams of FIG. 2 and FIG. 3. Differences in the diagrams b) and c) result from the fact that in FIG. 2, the setpoint value is generated, as is known from the prior art, through a tap of the voltage at the rectifier output, whereas the diagrams of FIG. 3 result from the use of an electronic ballast according to the present disclosure. As can clearly be seen, the progression of the current $I_d$(Q100) in the diagram of FIG. 2*b*) has very abrupt changes, which is disadvantageous from the point of view of radio interference suppression and of grid current harmonics. In the progression of the current $I_d$(Q100) of an electronic ballast according to the present disclosure on the other hand, see the diagram of FIG. 3*b*), such abrupt changes are not present, and the progression is smoother.

As can be seen from the diagram of FIG. 2*c*, where the progression of the voltage V(n109) is shown, a setpoint value is already present close to the zero transition in the prior art. As a result of this, the voltage V(n016) at the output of the operational amplifier IC1-B rises, wherein, in the present design, no overshoot or settling of the current $I_d$(Q100) is visible. As can be seen from the corresponding progression in FIG. 3*c*, these disadvantages are overcome in an electronic ballast according to the present disclosure.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. An electronic ballast for operating at least a first and a second cascade of LEDs, comprising:

an input with a first and a second input terminal for connecting to an alternating power supply voltage;

a rectifier that is connected to the first and to the second input terminal, wherein the rectifier has an output with a first and a second output terminal;

a first unit that comprises the first cascade of LEDs;

at least one second unit that comprises the second cascade of LEDs, wherein an electronic switch is connected in parallel with the second cascade of LEDs;

wherein the first unit is connected to the first output terminal of the rectifier, and the at least one second unit is connected in series with the first unit, said connection being at the end of the first unit that is not connected to the first output terminal of the rectifier;

a series circuit comprising a linear controller and a shunt resistor, wherein this series circuit is connected in series between the second unit and the second output terminal of the rectifier;

a setpoint value specification device for the linear controller with a first and a second input and an output, wherein the output of the setpoint value specification device is connected to the linear controller, wherein the first input of the setpoint value specification device is connected to the shunt resistor, wherein the second input of the setpoint value specification device is connected to the tap of a first voltage divider, wherein the first voltage divider is connected between the coupling point of the first unit and the second unit at one end and the second output terminal of the rectifier at the other end.

2. The electronic ballast as claimed in claim 1, wherein the first voltage divider comprises a first and a second ohmic resistor, wherein a capacitor is connected in parallel with the second ohmic resistor of the first voltage divider, which is connected between the tap of the first voltage divider and the second output terminal of the rectifier.

3. The electronic ballast as claimed in claim 2, wherein an auxiliary device is connected in parallel with the second ohmic resistor of the first voltage divider and is designed to adjust the edge steepness of the voltage, dropped across the second ohmic resistor.

4. The electronic ballast as claimed in claim 3, wherein the auxiliary device comprises an electronic switch with a control electrode, a working electrode and a reference electrode, wherein the control electrode is connected to the tap of a second voltage divider comprising a first and a second ohmic resistor, wherein the second voltage divider is connected in parallel with the first voltage divider.

5. The electronic ballast as claimed in claim 4, wherein a Zener diode and/or a capacitor is connected in parallel with the second ohmic resistor of the second voltage divider, which is connected between the tap of the second voltage divider and a reference potential.

6. The electronic ballast as claimed in claim 2, wherein the setpoint value specification device comprises an operational amplifier whose inverting input represents the first input of the setpoint value specification device, and whose non-inverting input represents the second input of the setpoint value specification device.

7. The electronic ballast as claimed in claim 6, wherein an auxiliary device is connected in parallel with the second ohmic resistor of the first voltage divider and is designed to adjust the edge steepness of the voltage, dropped across the second ohmic resistor.

8. The electronic ballast as claimed in claim 7, wherein the auxiliary device comprises an electronic switch with a control electrode, a working electrode and a reference electrode, wherein the control electrode is connected to the tap of a second voltage divider comprising a first and a second ohmic resistor, wherein the second voltage divider is connected in parallel with the first voltage divider.

9. The electronic ballast as claimed in claim 8, wherein a Zener diode and/or a capacitor is connected in parallel with the second ohmic resistor of the second voltage divider, which is connected between the tap of the second voltage divider and a reference potential.

10. The electronic ballast as claimed in claim 1, wherein the setpoint value specification device comprises an operational amplifier whose inverting input represents the first input of the setpoint value specification device, and whose non-inverting input represents the second input of the setpoint value specification device.

11. The electronic ballast as claimed in claim 10, wherein the operational amplifier is connected in such a way that it acts as a P-controller, as a PI-controller or as an I-controller.

12. The electronic ballast as claimed in claim 1, wherein a capacitor is connected in parallel with the respective cascade of LEDs.

13. The electronic ballast as claimed in claim 12, wherein a diode is connected in series between the LED cascade of a higher-lying unit and the capacitor of a lower-lying unit.

* * * * *